United States Patent
Lee et al.

(10) Patent No.: US 9,054,939 B2
(45) Date of Patent: Jun. 9, 2015

(54) METHOD OF PROCESSING DATA AND A DISPLAY APPARATUS PERFORMING THE METHOD

(75) Inventors: Sang-Keun Lee, Seoul (KR); Seung-Seok Nam, Asan-si (KR); Sung-Gon Jung, Suwon-si (KR); Sang-Su Han, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 306 days.

(21) Appl. No.: 13/311,769

(22) Filed: Dec. 6, 2011

(65) Prior Publication Data

US 2012/0206429 A1  Aug. 16, 2012

(30) Foreign Application Priority Data

Feb. 10, 2011  (KR) .................. 10-2011-0011914

(51) Int. Cl.
  *G06F 3/038*  (2013.01)
  *H04L 27/00*  (2006.01)
  *H04L 25/49*  (2006.01)
  *G09G 3/36*  (2006.01)
  *G09G 5/00*  (2006.01)

(52) U.S. Cl.
  CPC .......... *H04L 25/4902* (2013.01); *G09G 3/3614* (2013.01); *G09G 3/3648* (2013.01); *G09G 5/008* (2013.01)

(58) Field of Classification Search
  CPC .................................................. G09G 2370/08
  USPC ....................... 345/89, 98, 101, 204; 375/340
  See application file for complete search history.

(56) References Cited

U.S. PATENT DOCUMENTS

| | | | | |
|---|---|---|---|---|
| 5,986,648 | A * | 11/1999 | Okada et al. .................. | 345/204 |
| 6,256,024 | B1 * | 7/2001 | Maekawa ....................... | 345/205 |
| 2008/0170643 | A1 * | 7/2008 | Lee ............................... | 375/340 |
| 2008/0191995 | A1 * | 8/2008 | Cheon et al. .................. | 345/101 |

* cited by examiner

*Primary Examiner* — Kathy Wang-Hurst
*Assistant Examiner* — Peijie Shen
(74) *Attorney, Agent, or Firm* — F. Chau & Associates, LLC (57) ABSTRACT

A method of processing data including dividing, at a transmitter, data into 3-bit units, generating, at the transmitter, first and second clock embedded data signals and a third data signal, wherein a clock signal and first bits of the units are included in the first clock embedded data signal, the clock signal and second bits of the units are included in the second clock embedded data signal and third bits of the units are included in the third data signal, transmitting, from the transmitter to a receiver, the first and second clock embedded data signals and the third data signal, and restoring, at the receiver, the first and second bits and the clock signal from the first and second clock embedded data signals and the third bits from the third data signal.

18 Claims, 5 Drawing Sheets

METHOD OF PROCESSING DATA AND A DISPLAY APPARATUS PERFORMING THE METHOD

CROSS-REFERENCE TO RELATED APPLICATION

This application claims priority under 35 U.S.C. §119 to Korean Patent Application No. 10-2011-0011914, filed on Feb. 10, 2011, in the Korean Intellectual Property Office (KIPO), the disclosure of which is incorporated by reference herein in its entirety.

BACKGROUND

1. Technical Field

The present invention relates to a method of processing data and a display apparatus for processing data by performing the method. More particularly, the present invention relates to a method of processing data for driving a high resolution and a high speed frame, and a display apparatus for performing the method.

2. Discussion of the Related Art

A display apparatus may transmit data with a high resolution and a high frame rate.

Methods of transmitting data between components in the display apparatus may include a low voltage differential signaling (LVDS), a digital visual interface (DVI), a high-definition multimedia interface (HDMI), a reducing swing differential signaling (RSDS), a mini-LVDS interface and a point to point differential signaling (PPDS).

The methods above include an additional clock lane for transmitting a clock signal.

A display apparatus employing one of these methods needs an additional line for the clock lane. However, electrode magnetic interference (EMI) may occur between the additional line and nearby signal lines such as data lines.

Further, for the display apparatus to transmit data with a high resolution and a high frame rate, data transmitting speeds are increased. However, this increases the number of the lines used for data transmission, and thus, may increase an area of a printed circuit board (PCB) including the lines.

Accordingly, there is a need to reduce the number of lines used in transmitting data with a high resolution and a high frame rate.

SUMMARY

Exemplary embodiments of the present invention provide a method of processing data, wherein the method enhances a data transmitting speed and does not employ a separate clock line, and a display apparatus for performing the method of processing data.

According to an exemplary embodiment of the present invention, a method of processing data includes dividing, at a transmitter, data into 3-bit units, generating, at the transmitter, first and second clock embedded data signals and a third data signal, wherein a clock signal and first bits of the units are included in the first clock embedded data signal, second bits of the units are included in the second clock embedded data signal and third bits of the units are included in the third data signal, transmitting, from the transmitter to a receiver, the first and second clock embedded data signals and the third signal and restoring, at the receiver, the first and second bits and the clock signal from the first and second clock embedded data signals and the third bits from the third data signal.

In an exemplary embodiment of the present invention, generating the first and second clock embedded data signals and the third data signal may include, pulse-amplitude-modulating the first and second bits of the units to generate first and second signals, respectively, reversing polarities of the first and second signals in response to the clock signal and embedding the clock signal in the first and second signals where the polarity reversal occurs to convert the first and second signals to the first and second clock embedded signals, respectively, and pulse-amplitude-modulating the third bits to generate a third signal. The first bit may be the highest bit of the units, the second bit may be the middle bit of the units, and the third bit may be the lowest bit of the units.

In an exemplary embodiment of the present invention, pulse-amplitude-modulating the first and second bits may include generating the first signal having a first positive polarity level voltage and a second positive polarity level voltage and the second signal having a first negative polarity level voltage and a second negative polarity level voltage.

In an exemplary embodiment of the present invention, the first bits may be pulse-amplitude-modulated to the first positive polarity level voltage when the first bits are "1." The first bits may be pulse-amplitude-modulated to the second positive polarity level voltage when the first bits are "0." The second bits may be pulse-amplitude-modulated to the first negative polarity level voltage when the second bits are "1." The second bits may be pulse-amplitude-modulated to the second negative polarity level voltage when the second bits are "0."

In an exemplary embodiment of the present invention, the third bits may be pulse-amplitude-modulated to a first level voltage when the third bits are "1," and the third bits may be pulse-amplitude-modulated to a second level voltage when the third bits are "0."

In an exemplary embodiment of the present invention, the first and second clock embedded signals and the third signal may be amplified to respectively generate the first and second clock embedded data signals and the third data signal.

In an exemplary embodiment of the present invention, the first to third bits may be restored by converting first and second clock embedded data signals and the third data signal back to the first and second clock embedded signal and the third signal, respectively, and comparing each of the first and second clock embedded signals and the third signal with a reference voltage, and the clock signal may be restored by detecting a time when a reversal of the polarities of amplitudes of the first and second clock embedded signals occurs and regenerating the clock signal based on the detected time.

In an exemplary embodiment of the present invention, in restoring the first to third bits, the amplitudes of the first and second clock embedded signals and the third signal may be compared with an amplitude of the reference voltage. "1" may be outputted when the amplitudes of the first clock embedded signal are greater than the amplitude of the reference voltage, "1" may be outputted when the amplitudes of the second clock embedded signal are greater than the amplitude of the reference voltage, and "1" may be outputted when the amplitudes of the third signal are greater than the amplitude of the reference voltage. "0" may be outputted when the amplitudes of the first clock embedded signal are less than the amplitude of the reference voltage, "0" when the amplitudes of the second clock embedded signal are less than the amplitude of the reference voltage and "0" when the amplitudes of the third signal are less than the amplitude of the reference voltage.

In an exemplary embodiment of the present invention, the reference voltage may include first, second and third reference voltages. The first reference voltage may have a value between the first positive polarity level voltage and the second positive polarity level voltage. The second reference voltage may have a value between the first negative polarity level voltage and the second negative polarity level voltage. The third reference voltage may have a value between the first level voltage and the level voltage.

According to an exemplary embodiment of the present invention, a display apparatus includes a controller, a data driving circuit and a display panel. The controller divides data into 3-bit units, and converts the divided data to first and second clock embedded data signals and a third data signal. A clock signal and first bits of the units are included in the first clock embedded data signal, the clock signal and second bits of the units are included in the second clock embedded data signal and third bits of the units are included in the third data signal. The data driving circuit receives the first and second clock embedded data signals and the third data signal from the controller, and restores the first to third bits from the first and second clock embedded data signals and the third data signal to convert the first to third bits to data voltages that correspond to the data divided by the controller. The display panel displays image based on the data voltage.

In an exemplary embodiment of the present invention, the controller may include a data dividing part, and a clock embedded signal generating part. The data dividing part may divide the data into the 3-bit units, wherein each unit includes one of the first bits, one of the second bits and one of the third bits. The clock embedded signal generating part may pulse-amplitude-modulate the first and second bits of the units to generate first and second clock embedded signals, and pulse-amplitude-modulate the third bits to generate a third signal. The first bits may be the highest bits of the units, and the second bits may be the middle bits of the units, and the third bits may be the lowest bits of the units.

In an exemplary embodiment of the present invention, the clock embedded signal generating part may receive the first and second bits, and pulse-amplitude-modulate the first bits to a first positive polarity level voltage and a second positive polarity level voltage, and pulse-amplitude-modulate the second bits to a first negative polarity level voltage and a second negative polarity level voltage to generate first and second signals, respectively.

In an exemplary embodiment of the present invention, the clock embedded signal generating part may pulse-amplitude-modulate the first bits to the first positive polarity level voltage when the first bits are "1" and pulse amplitude modulate the first bits to the second positive polarity level voltage when the first bits are "0." The clock embedded signal generating part may pulse-amplitude-modulate the second bits to the first negative polarity level voltage when the second bits are "1" and pulse amplitude modulates the second bits to the second negative polarity level voltage when the second bits are "0."

In an exemplary embodiment of the present invention, the clock embedded signal generating part may pulse-amplitude-modulate the third bits to a first level voltage when the third bit are "1," and pulse-amplitude-modulate the third bits to a second level voltage when the third bits are "0."

In an exemplary embodiment of the present invention, the clock embedded signal generating part may reverse polarities of the first and second signals and embed the clock signal in each of the first and second signals at a time when the polarity reversal occurs.

In an exemplary embodiment of the present invention, the data driving circuit may include a clock embedded signal restoring part restoring the first, second and third bits from the first and second clock embedded signals and the third signal by comparing each of the first and second clock embedded signals and the third signal with a reference voltage, and generating clock synchronism information by detecting a time when a reversal of amplitude polarities of the first and second clock embedded signals occurs.

In an exemplary embodiment of the present invention, the clock embedded signal restoring part may compare amplitudes of the first and second clock embedded signals and the third signal with an amplitude of the reference voltage. The clock embedded signal restoring part may output "1" when the amplitudes of the first clock embedded signal are greater than the amplitude of the reference voltage, "1" when the amplitudes of the second clock embedded signal are greater than the amplitude of the reference voltage and "1" when the amplitudes of the third signal are greater than the amplitude of the reference voltage. The clock embedded signal restoring part may output "0" when the amplitudes of the first clock embedded signal are less than the amplitude of the reference voltage, "0" when the amplitudes of the second clock embedded signal are less than the amplitude of the reference voltage and "0" when the amplitudes of the third signal are less than the amplitude of the reference voltage.

In an exemplary embodiment of the present invention, the data driving circuit may further include a clock pulse generating part. The clock pulse generating part may receive the clock synchronism information, and may restore the clock signal based on the clock synchronism information, and may output the clock signal.

In an exemplary embodiment of the present invention, the data driving circuit may further include a data combining part receiving the first, second and third bits, and restoring the data divided by the controller based on these received bits.

According to an exemplary embodiment of the present invention, receiving, at a controller, a data stream, wherein the data stream includes a plurality of bits; dividing, at the controller, the data stream into a plurality of units, wherein each unit includes at least three bits; generating, at the controller, first to third signals including first to third bits of the units, respectively, wherein a clock pulse is embedded in each of the first and second signals, outputting, from the controller, the first to third signals, via first to third signal lines, respectively, and recovering, at a driving circuit coupled to the controller via the first to third signal lines, the first to third bits as the data stream from the first to third signals, and the clock pulse from the first and second signals.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Hereinafter, exemplary embodiments of the present invention will be explained in detail with reference to the accompanying drawings.

Figure 1:
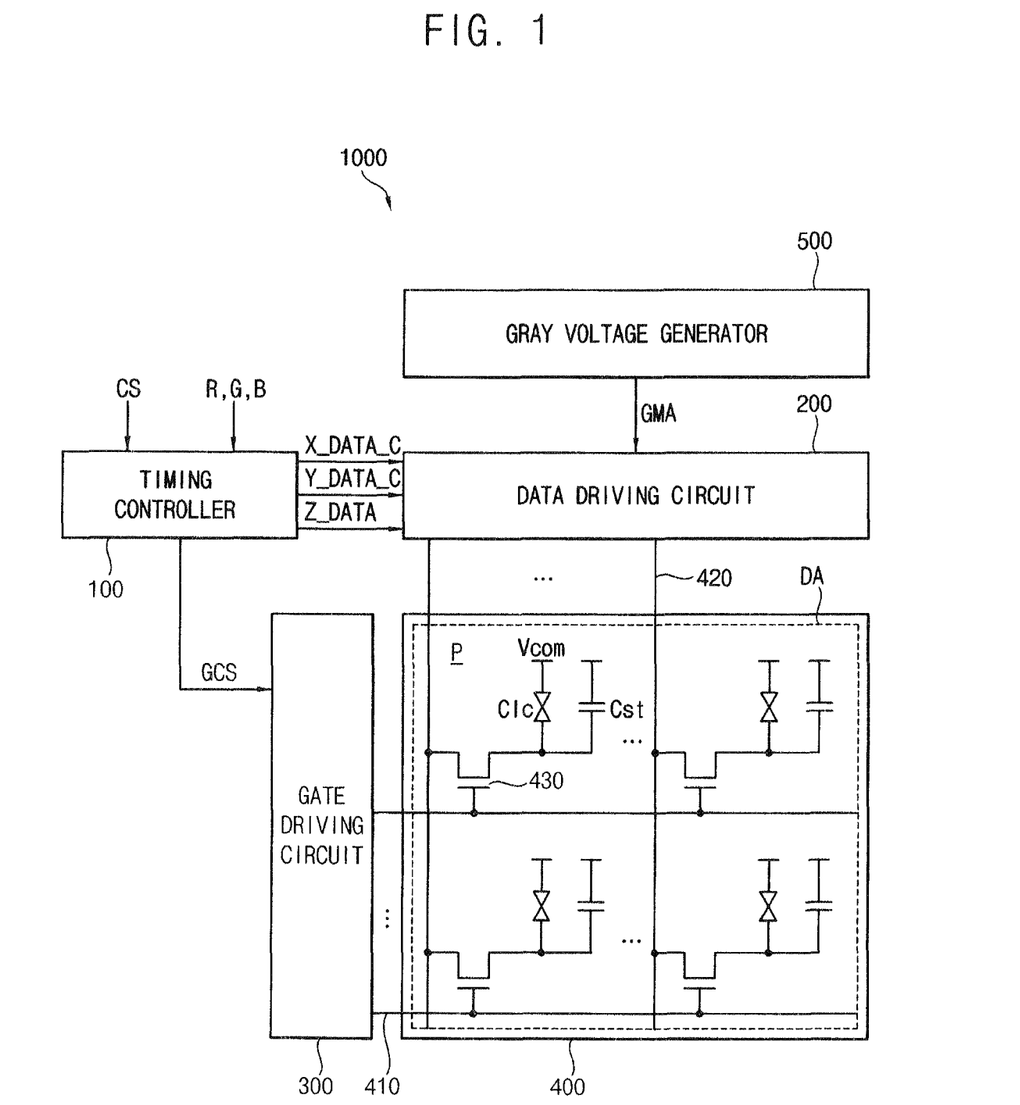
FIG. 1 is a block diagram illustrating a display apparatus according to an exemplary embodiment of the present invention.

FIG. 1 is a block diagram illustrating a display apparatus according to an exemplary embodiment of the present invention.

Referring to the FIG. 1, the display apparatus 1000 in FIG. 1 includes a timing controller 100, a data driving circuit 200, a gate driving circuit 300, a display panel 400 and a gray voltage generator 500.

The timing controller 100 provides a data signal RGB and timing signals for controlling a display of the display panel 400 to the data and gate circuits 200 and 300. For example, an external graphic controller (not shown) inputs the data signal RGB and a control signal CS to the timing controller 100. The timing controller 100 generates first and second clock embedded data signals X_DATA_C and Y_DATA_C and a third data signal Z_DATA using the data signal RGB and the control signal CS and provides these three signals to the data driving circuit 200. The first and second clock embedded data signals X_DATA_C and Y_DATA_C are data signals in which clock signals are embedded. In addition, the timing controller 200 generates a gate control signal GCS, and provides the gate control signal GCS to the gate driving circuit 300.

The data driving circuit 200 may include a plurality of data driving ICs (not shown). The data driving circuit 200 converts the first and second clock embedded data signals X_DATA_C and Y_DATA_C and the third data signal Z_DATA provided from the timing controller 100 to apply the data signal RGB to a data line 420 arranged on the display panel 400.

The gate driving circuit 300 may include a plurality of gate driving ICs (not shown). The timing controller 100 provides the gate control signal GCS to the gate driving circuit 300, and the gate driving circuit 300 sequentially applies a plurality of gate ON/OFF signals to a gate line 410 arranged on the display panel 400.

The display panel 400 includes a plurality of pixel portions P and a display area DA on which the pixel portions P are formed. The display area DA includes a plurality of gate lines 410 extending along a first direction D1 and a plurality of data lines 420 extending along a second direction D2 crossed with the first direction D1. At least one of the pixel portions P may be defined by an area where a pair of adjacent gate lines 410 intersect with a pair of adjacent data lines 410 and a pixel electrode is formed. Each of the pixel portions P may include a switching element 430 connected to each of the intersecting gate and data lines 410 and 420, a liquid crystal capacitor CLC connected to the switching element 430, and a storage capacitor CST connected to the liquid crystal capacitor CLC.

The gray voltage generator 500 generates gray voltages GMA having positive polarity and negative polarity with regard to a luminance of the display panel 400. The gray voltages GMA are outputted to the data driving circuit 200.

Figure 2:
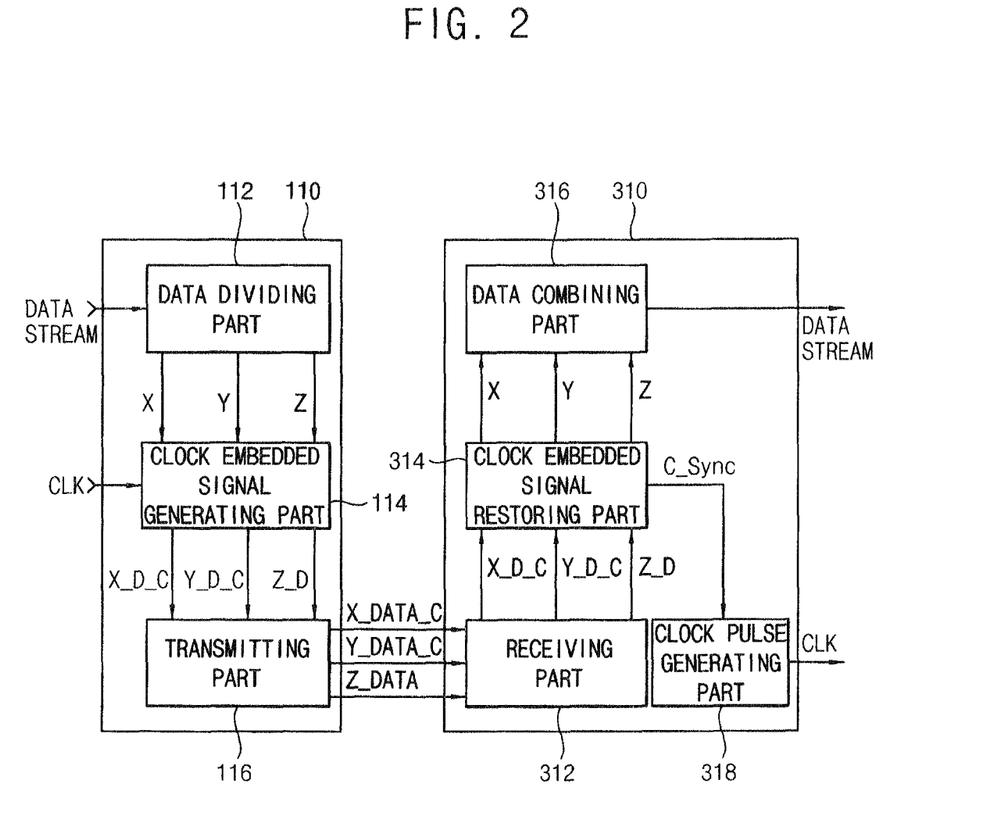
FIG. 2 is a block diagram illustrating a transmitter of a timing controller illustrated in FIG. 1 and a receiver of a data driving circuit illustrated in FIG. 1, according to an exemplary embodiment of the present invention.

FIG. 2 is a block diagram illustrating a transmitter of the timing controller 100 illustrated in FIG. 1 and a receiver of the data driving circuit 200 illustrated in FIG. 1, according to an exemplary embodiment of the present invention.

Referring to the FIG. 2, the transmitter 110 transmits the first and second clock embedded data signals X_DATA_C and Y_DATA_C and the third data signal Z_DATA to the receiver 310.

The transmitter 110 includes a data dividing part 112, a clock embedded signal generating part 114 and a transmitting part 116.

The data dividing part 112 divides a data stream provided from the external into 3-bit units, and generates, for each 3-bit unit, a first bit X that is the highest bit, a second bit Y that is the middle bit and a third bit Z that is the lowest bit. The data dividing part 112 provides the first, second and third bits X, Y and Z to the clock embedded signal generating part 114.

The clock embedded signal generating part 114 pulse-amplitude-modulates (PAM) the first and second bits X and Y to generate first and second signals. Thereafter, a clock signal CLK provided from the external is embedded in the first and second signals to generate first and second clock embedded signals X_D_C and Y_D_C, and the first and second clock embedded signals X_D_C and Y_D_C are provided to the transmitting part 116.

In addition, the clock embedded signal generating part 114 pulse-amplitude-modulates (PAM) the third bit Z to generate a third signal Z_D. The clock signal CLK is not embedded in the third signal Z-D. The clock embedded signal generating part 114 provides the third signal Z_D to the transmitting part 116.

In the present embodiment, the pulse-amplitude-modulation (PAM) is defined as modulating the first and second bits X and Y such that each of the modulated bits forms a signal having two positive polarity amplitudes representing 0 and 1 and two negative polarity amplitudes representing 0 and 1. Clock signal CLK information is embedded when the polarities of the first and second bits X and Y are reversed from the positive polarity to the negative polarity, or reversed from the negative polarity to the positive polarity. Clock signal CLK information may be embedded in a signal having a constant polarity but after a predetermined number of bits of the data stream have been received at the clock embedded signal generating part 114.

The transmitting part 116 converts the first and second clock embedded signals X_D_C and Y_D_C provided from the clock embedded signal generating part 114, to the first and second clock embedded data signals X_DATA_C and Y_DATA_C. In addition, the transmitting part 116 converts the third signal Z_D to the third data signal Z_DATA.

Thereafter, the first and second clock embedded data signals X_DATA_C and Y_DATA_C and the third data signal Z_DATA are transmitted to the receiver 310 through three transmitting lines. More transmitting lines may be used if the data stream is divided, for example, into 4, 5 or 6 bit-units. In the case where four transmitting lines are used for a data stream divided into 4-bit units, a fourth data signal (with no embedded clock) may be generated based on the fourth bits of the units.

The transmitting part 116 may perform a buffering so that the transmitting part 116 may transmit the first and second clock embedded data signals X_DATA_C and Y_DATA_C in differential signal forms.

The transmitting part 116 amplifies the first and second clock embedded signals X_D_C and Y_D_C and the third signal Z_D to convert them to the first and second clock embedded data signals X_DATA_C and Y_DATA_C and the third data signal Z_DATA, which are appropriate for transmitting.

The receiver 310 receives the first and second clock embedded data signals X_DATA_C and Y_DATA_C and the third data signal Z_DATA transmitted from the transmitter 110, and restores the data stream. If, a fourth data signal were transmitted as mentioned above, the operations performed on the fourth data signal may be substantially the same as those to be described below for the third data signal Z_DATA.

The receiver 310 includes a receiving part 312, a clock embedded signal restoring part 314, a data combining part 316 and a clock pulse generating part 318.

The receiving part 312 converts the first and second clock embedded data signals X_DATA_C and Y_DATA_C and the third data signal Z_DATA provided from the transmitting part 116 through three transmitting lines, back to the first and second clock embedded signals X_D_C and Y_D_C and third signal Z_D, and provides the first and second clock embedded signals X_D_C and Y_D_C and third signal Z_D to the clock embedded signal restoring part 314.

The clock embedded signal restoring part 314 restores the first and second bits X and Y and clock signal synchronism information C_Sync from the first and second clock embedded signals X_D_C and Y_D_C provided from the receiving part 312, and respectively provides the first and second bits X and Y and clock signal synchronism information C_Sync to the data combining part 316 and the clock pulse generating part 318. In addition, the clock embedded signal restoring part 314 restores the third bit Z from the third signal Z_D, and provides the third bit Z to the data combining part 316.

For example, the clock embedded signal restoring part 314 restores the first and second bits X and Y by comparing the first and second clock embedded signals X_D_C and Y_D_C with a level of a reference voltage. In the present embodiment, the reference voltage is used for detecting two positive polarity amplitudes representing 0 and 1 and two negative polarity amplitudes representing 0 and 1.

In addition, the clock embedded signal restoring part 314 generates and provides the clock signal synchronism information C_Sync to the clock pulse generating part 318, wherein the clock signal synchronism information C-Synch corresponds to when the amplitude polarities of the first and second clock embedded signals X_D_C and Y_D_C are switched from the positive polarity to the negative polarity or from the negative polarity to the positive polarity. On the other hand, the clock signal synchronization information C-Synch may correspond to when a predetermined number of bit pulses have elapsed in a signal whose polarity does not change.

The data combining part 316 combines the first, second and third bits X, Y and Z provided from the clock embedded signal restoring part 314, to generate the data stream to be output from the receiver 310.

The clock pulse generating part 318 generates the clock signal CLK synchronized by the clock signal synchronism information C_Sync provided from the clock embedded signal restoring part 314. This clock signal CLK may be provided to the display panel 400 or other components of the display apparatus 1000.

Figure 3:
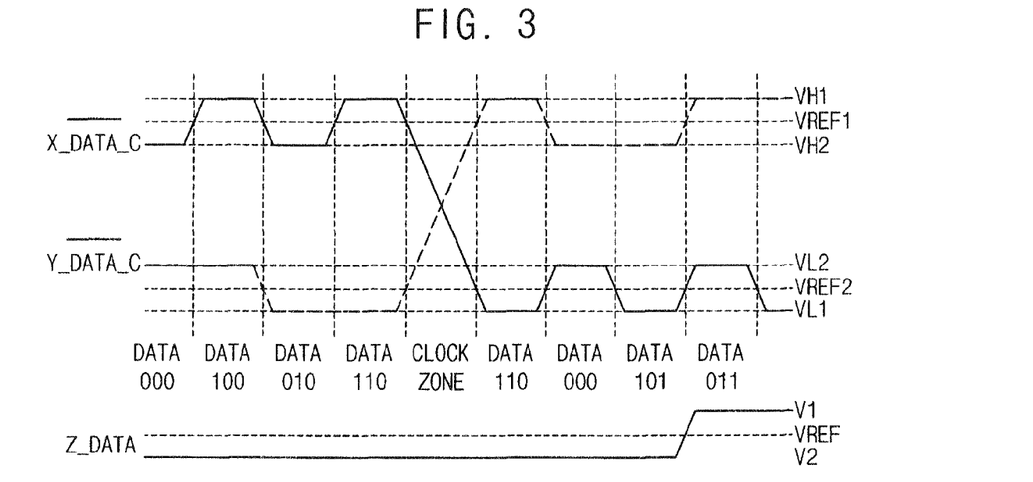
FIG. 3 is a timing diagram of clock embedded data signals outputted from the transmitter illustrated in FIG. 2, according to an exemplary embodiment of the present invention.

FIG. 3 is a timing diagram of clock embedded data signals outputted from the transmitter illustrated in FIG. 2, according to an exemplary embodiment of the present invention. Particularly, FIG. 3 illustrates the clock embedded data signals, and each clock pulse of the clock embedded data signals is embedded in between each 12 bits of data.

Referring to FIG. 3, the first and second clock embedded data signals X_DATA_C and Y_DATA_C and the third data signal Z_DATA according to the present embodiment are generated when the data stream of "000 100 010 110" and "110 000 101 011" is divided into 3-bit units and the clock pulse information is embedded in the first and second clock signals X_DATA_C and Y_DATA_C after the first 12 bits of data.

The first clock embedded data signal X_DATA_C has positive polarity level voltages VH2, VH1, VH2 and VH1 and negative polarity level voltages VL1, VL2, VL1 and VL2 of pulse-amplitude-modulation levels corresponding to "0 1 0 1" and "1 0 1 0" that are the first bits of the data stream "000 100 010 110" and "110 000 101 011". The clock information is embedded when the pulse-amplitude-modulation level is switched from the positive polarity level voltages to the negative polarity level voltages.

The second clock embedded data signal Y_DATA_C has the negative polarity level voltages VL2, VL2, VL1 and VL1 and the positive polarity level voltages VH1, VH2, VH2 and VH1 of pulse-amplitude-modulation levels corresponding to "0 0 1 1" and "1 0 0 1" that are the second bits of the data stream "000 100 010 110" and "110 000 101 011". The clock information is embedded when the pulse-amplitude-modulation level is switched from the negative polarity level voltage to the positive polarity level voltage. Accordingly, the receiving part 312 detects a time when the polarities of the first and second clock embedded data signals X_DATA_C and Y_DATA_C are reversed and crossed, and thus, synchronism information of the embedded clock signal CLK. In the case where no polarity reversal occurs, the receiving part 312 may count the predetermined number of bits to find the embedded clock information.

The third data signal Z_DATA has the polarity voltages V2, V2, V2, V2, V2, V2, V1 and V1 as the pulse-amplitude-modulation levels that are "0 0 0 0" and "0 0 1 1" corresponding to the third bits of the data stream "000 100 010 110" and "110 000 101 011".

According to the present embodiment, a clock pulse is embedded between each 12 bits of data that is 4 pulse-amplitude-modulated; however, the exemplary embodiment may not be limited thereto. The clock pulse may be embedded between each 10 bits of data, each 16 bits of data or each 20 bits of data.

Figure 4:
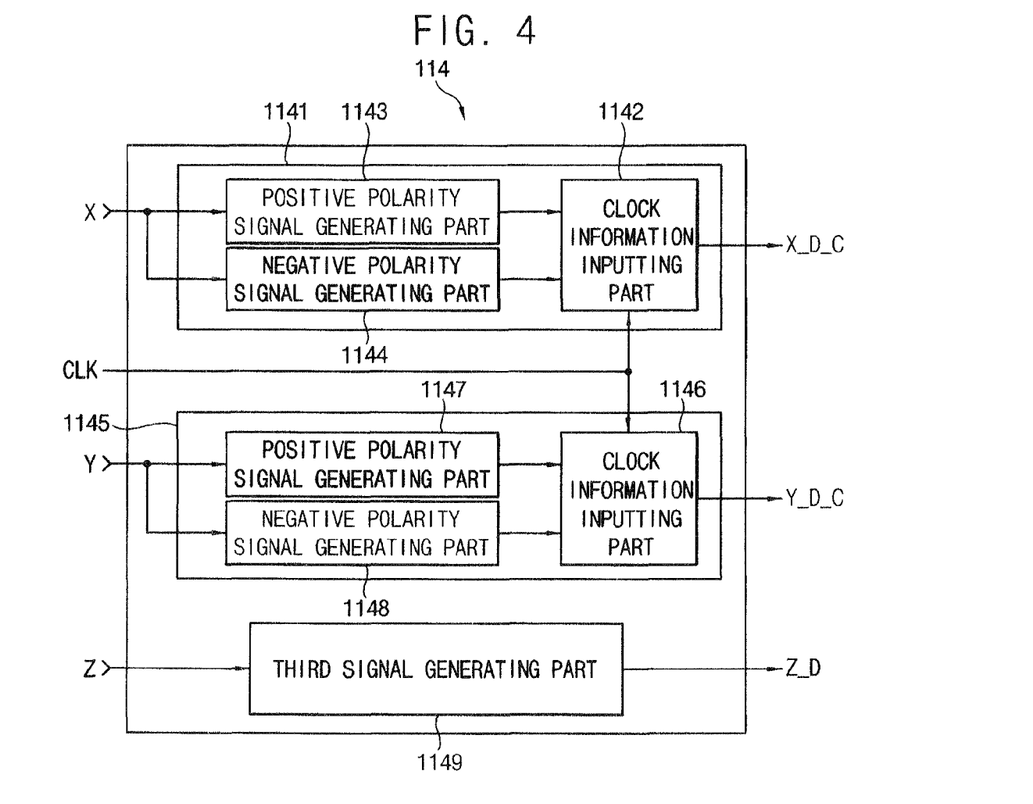
FIG. 4 is a block diagram illustrating a clock embedded signal generating part illustrated in FIG. 2, according to an exemplary embodiment of the present invention.

FIG. 4 is a block diagram illustrating the clock embedded signal generating part 114 illustrated in FIG. 2, according to an exemplary embodiment of the present invention. Referring to FIG. 4, the clock embedded signal generating part 114 includes first and second clock embedded signal generating parts 1141 and 1145 and a third signal generating part 1149.

The first clock embedded signal generating part 1141 is provided with the first bit X and the clock signal CLK to generate the first clock embedded signal X_D_C in which the clock signal CLK information is embedded.

The first clock embedded signal generating part 1141 includes a clock information inputting part 1142, a positive polarity signal generating part 1143 and a negative polarity signal generating part 1144.

The positive polarity signal generating part 1143 pulse-amplitude-modulates a first bit X stream provided from the data dividing part 112, to generate a signal having two positive polarity amplitudes, and outputs this signal to the clock information inputting part 1142. In the present embodiment, the two positive polarity amplitudes correspond to 0 and 1 that the first bit X may have.

The negative polarity signal generating part 1144 pulse-amplitude-modulates the first bit X stream provided from the data dividing part 112, to generate a signal having two negative polarity amplitudes, and outputs this signal to the clock information inputting part 1142. In the present embodiment, the two negative polarity amplitudes correspond to 0 and 1 that the first bit X may have.

The clock information inputting part 1142 may for example receive the signal output from the positive polarity signal generating part 1143, wherein this signal corresponds to the first half of the first bit X stream. In response to the clock signal CLK, the clock information inputting part 1142 changes the polarity of the incoming signal and thus receives the signal output from the negative polarity signal generating part 1144, wherein this signal corresponds to the second half of the first bit X stream. When the clock signal CLK is received, the clock information inputting part 1142 embeds the clock signal CLK information between the signals corresponding to the first and second halves of the first bit X stream. The resulting signal is output from the clock information inputting part 1142 as the first clock embedded signal X_D_C.

The second clock embedded signal generating part 1145 is provided with the second bit Y stream and the clock signal CLK, and generates the second clock embedded signal Y_D_C, in which the clock signal CLK information is embedded. A method that the second clock embedded signal generating part 1145 generates the second clock embedded signal Y_D_C is substantially the same as the method that the first clock embedded signal generating part 1141 generates the first clock embedded signal X_D_C. Although not mentioned prior, the clock embedded signal generating part 114 may embed the clock signal CLK in more than two signals. In this case, additional signal generating parts may be used.

The second clock embedded signal generating part 1145 includes a clock information inputting part 1146, a positive polarity signal generating part 1147 and a negative polarity signal generating part 1148.

The third signal generating part 1149 is provided with the third bit Z stream, and generates the third signal Z_D. For example, the third signal generating part 1149 pulse-amplitude-modulates the third bit Z stream to a signal having two polarity amplitudes, and outputs this signal as the third signal Z_D. In the present embodiment, the two polarity amplitudes correspond to 0 and 1 that the third bit Z may have.

Figure 5:
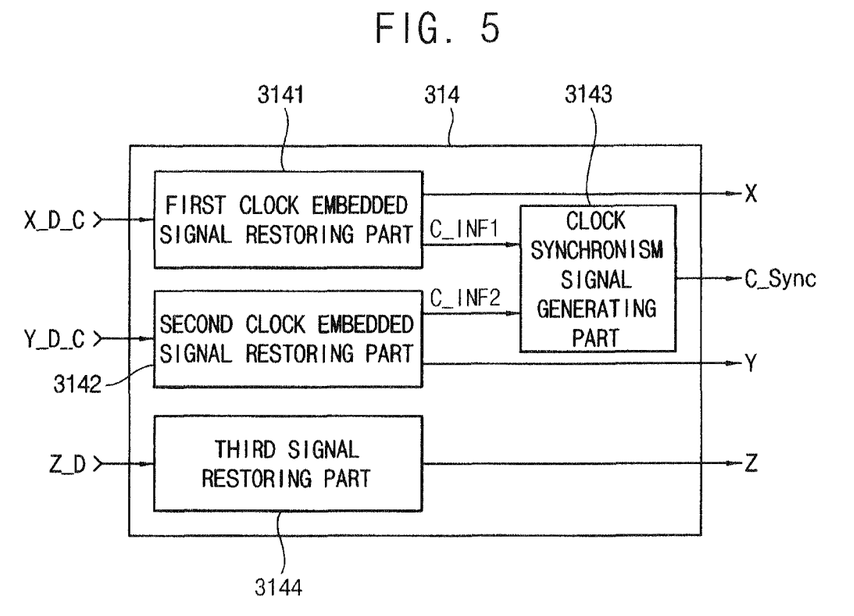
FIG. 5 is a block diagram illustrating a clock embedded signal restoring part illustrated in FIG. 2, according to an exemplary embodiment of the present invention.

FIG. 5 is a block diagram illustrating the clock embedded signal restoring part 314 illustrated in FIG. 2, according to an exemplary embodiment of the present invention.

Referring to FIG. 5, the clock embedded signal restoring part 314 includes first and second clock embedded signal restoring parts 3141 and 3142, a clock synchronism signal generating part 3143 and a third signal restoring part 3144.

The first clock embedded signal restoring part 3141 restores the first bit X stream and first clock signal information C_INF1 from the first clock embedded signal X_D_C. In the present embodiment, the first clock signal information C_INF1 identifies the time when a polarity of the first clock embedded signal X_D_C is reversed.

The second clock embedded signal restoring part 3142 restores the second bit Y stream and second clock signal information C_INF2 from the second clock embedded signal Y_D_C. In the present embodiment, the second clock signal information C_INF2 identifies the time when a polarity of the second clock embedded signal X_D_C is reversed.

The clock synchronism signal generating part 3143 generates the clock signal synchronism information C_Sync using the first and second clock signal information C_INF1 and C_INF2 provided from the first and second clock embedded signal restoring parts 3141 and 3142. For example, a first time when the first clock signal information C_INF1 is reversed and a second time when the second clock signal information C_INF2 is reversed, are crossed, and the clock synchronism signal generating part 3143 detects a crossed time of the first and second clock signal information C_INF1 and C_INF2, and may provide the crossed time as the clock signal synchronism information C_Sync. In the case where the clock signal UK has been embedded in more than two signals, for example three, a third time when this clock signal's information reverses and crosses the first and second times may be detected and used to determine the clock signal synchronism information C_Synch.

Figure 6:
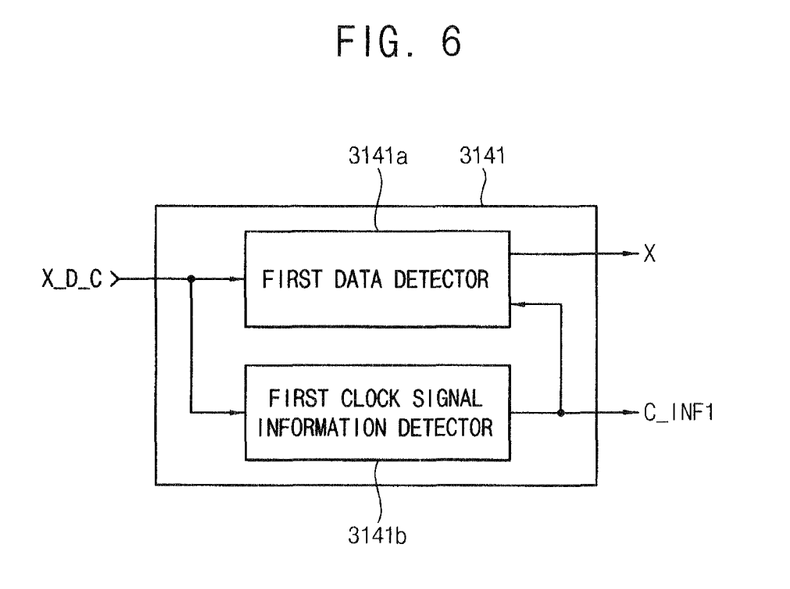
FIG. 6 is a block diagram illustrating a first clock embedded signal restoring part illustrated in FIG. 5, according to an exemplary embodiment of the present invention.

FIG. 6 is a block diagram illustrating the first clock embedded signal restoring part 3141 illustrated in FIG. 5, according to an exemplary embodiment of the present invention.

Referring to FIG. 6, the first clock embedded signal restoring part 3141 includes a first data detector 3141a and a first clock signal information detector 3141b.

The first data detector 3141a is provided with the first clock embedded signal X_D_C, and restores the first bit X stream from the first clock embedded signal X_D_C. For example, the first data detector 3141a compares an amplitude of the first clock embedded signal X_D_C with each of first and second reference voltages VREF1 and VREF2. In the present embodiment, a reference voltage provides a margin corresponding to decrease of a signal level transmitted from the transmitting part 116 to the receiving part 312, and includes the first and second reference voltages VREF1 and VREF2. The first reference voltage VREF1 may have a value between the first positive polarity level voltage VH1 and the second positive polarity level voltage VH2, and the second reference voltage VREF2 may have a value between the first negative polarity level voltage VL1 and the second negative polarity level voltage VL2.

The first data detector 3141a compares the amplitude of the first clock embedded signal X_D_C with the first reference voltage VREF1, and when the amplitude of the first clock embedded signal X_D_C is greater than the first reference voltage VREF1, the first data detector 3141a outputs "1" as the first bit X. In addition, when the amplitude of the first clock embedded signal X_D_C is less than the first reference voltage VREF1, the first data detector 3141a outputs "0" as the first bit X.

In addition, the first data detector 3141a is provided with the first clock signal information C_INF1, from the first clock signal information detector 3141b, and at this time, compares the amplitude of the first clock embedded signal X_D_C with the second reference voltage VREF2.

When the amplitude of the first clock embedded signal X_D_C is greater than the second reference voltage VREF2, the first data detector 3141a outputs "0" as the first bit X. In addition, when the amplitude of the first clock embedded signal X_D_C is less than the second reference voltage VREF2, the first data detector 3142a outputs "1" as the first bit X.

The first clock signal information detector 3141b is provided with the first clock embedded signal X_D_C, and restores the first clock signal information C_INF1. For example, the first clock signal information detector 3141b detects the time when the amplitude of the first clock imbedded signal X_D_C is reversed, and provides the detected reverse time as the first clock signal information C_INF1.

For example, the first clock signal information detector 3141b detects a time when the amplitude of the first clock embedded signal X_D_C, which has the first positive polarity level voltage VH1 or the second positive polarity level voltage VH2, reverses such that the amplitude of the first clock embedded signal X_D_C has the first negative polarity level voltage VL1 or the second negative polarity level voltage VL2.

The first clock signal information detector 3141b may include a differential amplifier receiving the amplitude of the first clock embedded signal X_D_C and the reference voltage, and comparing the amplitude of the first clock embedded signal X_D_C and the reference voltage.

The second clock embedded signal Y_D_C is restored as the second bit Y stream and the second clock signal information C_INF2 by substantially the same method as restoring the first bit X stream and the first clock signal information C_INF1.

Figure 7:
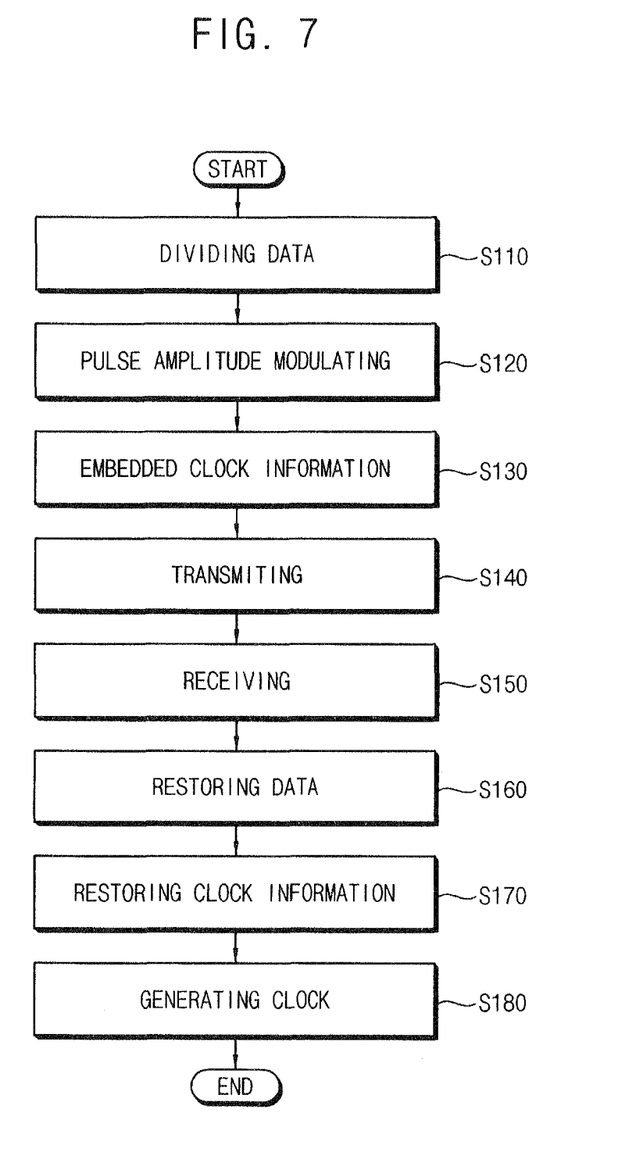
FIG. 7 is a flowchart illustrating a method of processing data in the display apparatus illustrated in FIG. 1, according to an exemplary embodiment of the present invention.

FIG. 7 is a flowchart illustrating a method of processing data in the display apparatus illustrated in FIG. 1, according to an exemplary embodiment of the present invention.

Referring to FIGS. 2 and 7, the data dividing part 112 divides the data stream into 3-bit units, and generates the first, second and third bits X, Y and Z for each 3-bit unit (step S110).

The clock embedded signal generating part 114 pulse-amplitude-modulates (PAM) the first and second bits X and Y to different amplitude polarities. In addition, the clock embedded signal generating part 114 pulse-amplitude-modulates (PAM) the third bit Z to different amplitudes (step S120)

For example, a pulse-amplitude-modulating (PAM) of the first and second bits X and Y is a 4 PAM having four amplitude levels for each of the first and second bits X and Y, and the four amplitude levels include the first positive polarity level voltage VH1, the second positive polarity level voltage VH2, the first negative polarity level voltage VL1, and the second negative polarity level voltage VL2. The clock embedded signal generating part 114 converts the first and second bits X and Y to the first and second clock embedded signals X_D_C and Y_D_C.

In addition, a pulse-amplitude-modulating (PAM) of the third bit Z is a binary transmittance having two amplitude levels, and the two amplitude levels include the first and second level voltages V1 and V2. The clock embedded signal generating part 114 pulse-amplitude-modulates the third bit Z and generates the third signal Z_D.

The signal polarities that are pulse-amplitude-modulated corresponding to the first and second bits X and Y are reversed with respect to each other. Thus, when the amplitude corresponding to the first bit X is the positive polarity level voltage, the amplitude corresponding to second bit Y is the negative polarity level voltage.

The clock information inputting part 1142 reverses the amplitude polarity of each of the first and second bits X and Y in response to the clock signal CLK by pulse-amplitude-modulating the first and second bits X and Y to generate the first and second clock embedded signals X_D_C and Y_D_C. In the present embodiment, the clock signal CLK is embedded into the first and second bits X and Y at a point where the amplitude polarity of each of the bits X and Y is reversed (step S130).

The transmitting part 116 transmits the first and second clock embedded data signals X_DATA_C and Y_DATA_C and the third data signal Z_DATA to the receiver 310 through three transmitting lines. To do this, the transmitting part 116 buffers and amplifies the first and second clock embedded signals X_D_C and YDC and the third signal Z_D to generate the first and second clock embedded data signals X_DATA_C and Y_DATA_C and the third data signal Z_DATA (step S140).

The receiving part 312 receives the first and second clock embedded data signals X_DATA_C and Y_DATA_C and the third data signal Z_DATA, and converts the first and second clock embedded data signals X_DATA_C and Y_DATA_C and the third data signal Z_DATA back to the first and second clock embedded signals X_D_C and Y_D_C and the third signal Z_D (step S150).

The clock embedded signal restoring part 314 restores the first to third bits X, Y and Z from the first and second clock embedded signals X_D_C and Y_D_C and the third signal Z_D in the manner described above with reference to FIGS. 5 and 6, for example, and provides these bits to the data combining part 316 (step S160). The data combining part 316 may then combine the first, second and third bits X, Y and Z to generate the data stream to be output from the receiver 310.

The clock embedded signal restoring part 314 also detects the time when the amplitude polarity of each of the amplitudes of the first and second clock embedded signals X_D_C and Y_D_C is reversed, and generates the clock signal synchronism information C_Sync (step S170). The clock embedded signal restoring part 314 provides the clock signal synchronism information C_Sync to the clock pulse generating part 318.

For example, the clock embedded signal restoring part 314 detects the time when the amplitude of the first clock embedded signal X_D_C, which is the same as the first positive polarity level voltage VH1 or the second positive polarity level voltage VH2, changes to be the same as the first negative polarity level voltage VL1 or the second positive polarity level voltage VL2, and outputs the change time as the first clock signal information C_INF1. The second clock signal information C_INF2 is determined by substantially the same method except that the second clock embedded signal Y_D_C is used.

Accordingly, the clock embedded signal restoring part 314 generates the first clock signal information C_INF1 and the second clock signal information C_INF2, detects the time when the first clock signal information C_INF1 and the second clock signal information C_INF2 are crossed, and provides the crossed time as the clock signal synchronism information. C_Sync.

The clock pulse generating part 318 generates the clock signal CLK corresponding to the clock signal synchronism information C_Sync (step S180).

According to an exemplary embodiment of the present invention, 3-bit units of data may be transmitted per symbol period. Thus, the line structure of the display apparatus for performing fast data transmitting with a high resolution and a high frame rate may be simple. In addition, the 3-bits are transmitted using four amplitude levels and, at the same time, the clock signal is embedded and transmitted along with two of the three bits. Thus, an additional clock lane may not be necessary. Accordingly, the area of a print circuit board (PCB) embodying such design may not increase, and further electromagnetic interference (EMI) due to more lines being formed adjacent each other may be reduced.

As explained above, the display apparatus according to an exemplary embodiment of the present invention may convert the first and second data signals to be pulse-amplitude-modulated by 4 levels and the third data signal to be pulse-amplitude-modulated by 2 levels, and transmit the converted signals one bit at a time through three lines during the symbol period.

Accordingly, a transmitting speed may be enhanced by 3 times that of a binary transmitting speed for transmitting one bit, and may be enhanced by 1.5 times that of the 4 PAM transmitting speed for transmitting two bits. Thus, the transmitting speed of the display apparatus may be enhanced and the number of lines used for data transmission in the display apparatus may be further reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing data, comprising:
dividing, at a transmitter, data into 3-bit units;
generating, at the transmitter, first and second clock embedded data signals and a third data signal, wherein a clock signal and first bits of the units are included in the first clock embedded data signal, the clock signal and second bits of the units are included in the second clock embedded data signal and third bits of the units are included in the third data signal;
transmitting, from the transmitter to a receiver, the first and second clock embedded data signals and the third data signal; and
restoring, at the receiver, the first and second bits and the clock signal from the first and second clock embedded data signals and the third bits from the third data signal,
wherein generating the first and second clock embedded data signals comprises,
pulse-amplitude-modulating, at a polarity signal generating part, the first and second bits of the units to generate first and second signals, respectively; and
receiving, at a clock information inputting part, the first and second signals from the polarity signal generating part, reversing polarities of the first and second signals in response to the clock signal and embedding the clock signal in the first and second signals where the polarity reversal occurs to convert the first and second signals to first and second dock embedded signals, respectively,
wherein the first and second bits of the units are each pulse-amplitude modulated by four levels,
wherein generating the third data signal comprises pulse-amplitude modulating the third bits of the units to generate a third signal, wherein the third bits of the units are pulse-amplitude modulated by two levels,
wherein pulse-amplitude-modulating the first and second bits comprises,
generating the first signal having a first positive polarity level voltage and a second positive polarity level voltage with respect to a first reference voltage and the second signal having a first negative polarity level voltage and a second negative polarity level voltage with respect to a second reference voltage,
wherein pulse-amplitude-modulating the third bits comprises,
pulse-amplitude-modulating the third bits to a first level voltage and a second level voltage with respect to a third reference voltage, the third reference voltage being different from each of the first and second reference voltages.

2. The method of processing data of claim 1, wherein the first bits include the highest bits of the units, the second bits include the middle bits of the units, and the third bits include the lowest bits of the units.

3. The method of processing data of claim 2, wherein pulse-amplitude-modulating the first and second hits further comprises:
pulse-amplitude-modulating the first bits to the first positive polarity level voltage when the first bits are "1," and pulse-amplitude-modulating the first bits to the second positive polarity level voltage when the first bits are "0," and
pulse-amplitude-modulating the second bits to the first negative polarity level voltage when the second bits are "1," and pulse-amplitude-modulating the second bits to the second negative polarity level voltage when the second bits are "0."

4. The method of processing data of claim 2, wherein the third bits are pulse-amplitude-modulated to the first level voltage when the third bits are "1," and pulse-amplitude-modulated to the second level voltage when the third bits are "0."

5. The method of processing data of claim 4, wherein generating the first and second clock embedded data signals and the third data signal further comprises:
amplifying the first and second clock embedded signals and the third signal to respectively generate the first and second clock embedded data signals and the third data signal.

6. The method of processing data of claim 5, wherein restoring the first to third bits comprises:
converting first and second clock embedded data signals and the third data signal back to the first and second clock embedded signals and the third signal, respectively, and comparing each of the first and second dock embedded signals and the third signal with at least one of the reference voltages.

7. The method of processing data of claim 6, wherein restoring the first to third bits further comprises:
comparing amplitudes of the first and second dock embedded signals and the third signal with an amplitude of at least one of the reference voltages;
outputting "1" when the amplitudes of the first clock embedded signal are greater than the amplitude of the first reference voltage, "1" when the amplitudes of the second clock embedded signal are greater than the amplitude of the second reference voltage and "1" when the amplitudes of the third signal are greater than the amplitude of the third reference voltage; and
outputting "0" when the amplitudes of the first clock embedded signal are less than the amplitude of the first reference voltage, "0" when the amplitudes of the second clock embedded signal are less than the amplitude of the second reference voltage and "0" when the amplitudes of the third signal are less than the amplitude of the third reference voltage.

8. The method of processing data of claim 7, wherein the first reference voltage has a value between the first positive polarity level voltage and the second positive polarity level voltage, the second reference voltage has a value between the first negative polarity level voltage and the second negative polarity level voltage, and the third reference voltage has a value between the first level voltage and the second level voltage.

9. The method of processing data of claim 7, wherein restoring the clock signal comprises:
detecting a time when a reversal of the polarities of the amplitudes of the first and second clock embedded signals occurs and regenerating the clock signal based on the detected time.

10. A display apparatus, comprising:
a controller dividing data into 3-bit units, and converting the divided data to first and second dock embedded data signals and a third data signal, wherein a clock signal and first bits of the units are included in the first clock embedded data signal, the clock signal and second bits of the units are included in the second clock embedded data signal and third bits of the units are included in the third data signal;

a data driving circuit receiving the first and second clock embedded data signals and the third data signal from the controller, restoring the first to third bits from the first and second clock embedded data signals and the third data signal and converting the first to third bits to data voltages that correspond to the data divided by the controller; and a display panel displaying images based on the data voltages, wherein the controller comprises, a data dividing part dividing the data into the 3-bit units, wherein each unit includes one of the first bits, one of the second bits and one of the third bits; and a clock embedded signal generating part pulse-amplitude-modulating, at a polarity signal generating part, the first and second bits of the units to generate first and second clock embedded signals, respectively, receiving, at a clock information inputting part, the first and second signals from the polarity signal generating part, reversing polarities of the first and second signals and embedding the clock signal in the first and second signals at a time when the polarity reversal occurs, wherein the first and second bits of the units are each pulse-amplitude modulated by four levels, wherein the clock embedded signal generating part pulse-amplitude-modulates the third bits of the units to generate a third signal, wherein the third bits of the units are pulse-amplitude modulated by two levels, wherein the clock embedded signal generating part receives the first and second bits, and pulse amplitude modulates the first bits to a first positive polarity level voltage and a second positive polarity level voltage with respect to a first reference voltage, and pulse amplitude modulates the second bits to a first negative polarity level voltage and a second negative polarity level voltage with respect to a second reference voltage to generate first and second signals, respectively, wherein the clock embedded signal generating part pulse-amplitude-modulates the third bits to a first level voltage and a second level voltage with respect to a third reference voltage, the third reference voltage being different from each of the first and second reference voltages.

11. The display apparatus of claim 10, wherein the first hits include the highest bits of the units, the second bits include the middle bits of the units, and the third bits include the lowest bits of the units.

12. The display apparatus of claim 11, wherein the clock embedded signal generating part puke amplitude modulates the first hits to the first positive polarity level voltage when the first bits are "1," pulse amplitude modulates the first bits to the second positive polarity level voltage when the first bits are "0," pulse amplitude modulates the second bits to the first negative polarity level voltage when the second bits are "1" and pulse amplitude modulates the second bits to the second negative polarity level voltage when the second bits are "0."

13. The display apparatus of claim 11, wherein the third bits are pulse-amplitude modulated to the first level voltage when the third bits are "1," and pulse-amplitude modulated to the second level voltage when the third bits are "0."

14. The display apparatus of claim 11, wherein the data driving circuit comprises, a dock embedded signal restoring part restoring the first, second and third bits from the first and second clock embedded signals and the third signal by comparing each of the first and second clock embedded signals and the third signal with at least one of the reference voltages, and generating clock synchronism information by detecting a time when a reversal of amplitude polarities of the first and second clock embedded signals occurs.

15. The display apparatus of claim 14, wherein the dock embedded signal restoring part compares amplitudes of the first and second clock embedded signals and the third signal with an amplitude of at least one of the reference voltages, and outputs "1" when the amplitudes of the first clock embedded signal are greater than the amplitude of the first reference voltage, "1" when the amplitudes of the second clod<embedded signal are greater than the amplitude of the second reference voltage and "1" when the amplitudes of the thirdsignal are greater than the amplitude of the third reference voltage, and outputs "0" when the amplitudes of the first clock embedded signal are less than the amplitude of the first reference voltage, "0" when the amplitudes of the second clock embedded signal are less than the amplitude of the second reference voltage and "0" when the amplitudes of the third signal are less than the amplitude of the third reference voltage.

16. The display apparatus of claim 14, wherein the data driving circuit further comprises a clock pulse generating part receiving the clock synchronism information, restoring the clock signal based on the clock synchronism information, and outputting the clock signal.

17. The display apparatus of claim 14, wherein the data driving circuit further comprises a data combining part receiving the first, second and third bits, and restoring the data divided by the controller based on these received bits.

18. A method of processing data, comprising:

receiving, at a controller, a data stream, wherein the data stream includes a plurality of bits;

dividing, at the controller, the data stream into a plurality of units, wherein each unit includes at least three bits;

generating, at the controller, first to third signals including first to third bits of the units, respectively, wherein a clock pulse is embedded in each of the first and second signals, outputting, from the controller, the first to third signals, via first to third signal lines, respectively, and recovering, at a driving circuit coupled to the controller via the first to third signal lines, the first to third bits as the data stream from the first to third signals, and the clock pulse from the first and second signals, wherein generating the first to third signals comprises, pulse-amplitude-modulating, at a polarity signal generating part, the first and second bits of the units to generate first and second internal signals, respectively; and receiving, at a dock information inputting part, the first and second internal signals from the polarity signal generating part, reversing polarities of the first and second internal signals and embedding the clock pulse in the first and second internal signals to generate the first and second signals, wherein the first and second bits of the units are each pulse-amplitude modulated by four levels and the third bits of the units are pulse-amplitude modulated by two levels, wherein the first bits are pulse-amplitude modulated to a first positive polarity level voltage and a second positive polarity level voltage with respect to a first reference voltage, and the second bits are pulse-amplitude modulated to a first negative polarity level voltage and a second negative polarity level voltage with respect to a second reference voltage, wherein the third bits are pulse-amplitude modulated to a first level voltage and a second level voltage with respect to a third reference voltage, the third reference voltage being different from each of the first and second reference voltage.

* * * * *